(12) United States Patent
Zhao et al.

(10) Patent No.: US 12,401,188 B2
(45) Date of Patent: Aug. 26, 2025

(54) CONTROL METHOD FOR CURRENT-LIMITING CONTROL CIRCUIT AND ELECTRICAL SYSTEM

(71) Applicant: Gree Electric Appliances, Inc. of Zhuhai, Guangdong (CN)

(72) Inventors: Zhigang Zhao, Guangdong (CN); Junhao Liao, Guangdong (CN); Yuanhua Lai, Guangdong (CN); Baowei Lin, Guangdong (CN); Xia Liu, Guangdong (CN); Chunyang Wang, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 406 days.

(21) Appl. No.: 18/016,236

(22) PCT Filed: Jul. 12, 2021

(86) PCT No.: PCT/CN2021/105781
§ 371 (c)(1),
(2) Date: Jan. 13, 2023

(87) PCT Pub. No.: WO2022/095498
PCT Pub. Date: May 12, 2022

(65) Prior Publication Data
US 2023/0275425 A1    Aug. 31, 2023

(30) Foreign Application Priority Data
Nov. 9, 2020  (CN) .......................... 202011241184.2

(51) Int. Cl.
*H02H 9/02*    (2006.01)
*H02H 1/00*    (2006.01)
*H02H 3/087*   (2006.01)

(52) U.S. Cl.
CPC .......... *H02H 9/025* (2013.01); *H02H 1/0007* (2013.01); *H02H 3/087* (2013.01)

(58) Field of Classification Search
CPC ...... H02H 9/025; H02H 1/0007; H02H 3/087; H02H 7/1213; H02H 3/044; H02H 9/02; H02H 7/268
See application file for complete search history.

(56) References Cited

U.S. PATENT DOCUMENTS 6,984,965 B2 *   1/2006   Vinciarelli ............ H02M 7/003
                                                    323/266
9,502,884 B2 *  11/2016   Ghisla ..................... H02H 3/38
(Continued)

FOREIGN PATENT DOCUMENTS

CN    1732612 A   *  2/2006 .............. H02M 1/36
CN  106655099 A      5/2017
(Continued)

OTHER PUBLICATIONS

Extended European Search Report, EP 21888200, Mar. 1, 2024.

*Primary Examiner* — Danny Nguyen
*Assistant Examiner* — Nicolas Bellido
(74) *Attorney, Agent, or Firm* — The Webb Law Firm

(57) ABSTRACT

The present disclosure provides a control method for a current-limiting control circuit and an electrical system. The current-limiting control circuit includes a high voltage side connected with a direct-current (DC) bus, a low voltage side connected with a load, and a regulating unit connected with the high voltage side and the low voltage side, the regulating unit including at least one MOS transistor, and the control method includes: detecting current $I_0$ of the current-limiting control circuit; determining whether the current $I_0$ is greater than a preset current I; and determining that the current-limiting control circuit has a short circuit fault, and entering (Continued)

a current limiting control mode to limit a persistent growth of the current, in a case where the current $I_O$ is greater than the preset current I.

20 Claims, 2 Drawing Sheets

(56) References Cited

U.S. PATENT DOCUMENTS

| | | | | |
|---|---|---|---|---|
| 10,608,428 | B2* | 3/2020 | Mannuccini | H02H 9/02 |
| 2004/0174147 | A1* | 9/2004 | Vinciarelli | H02J 1/102 |
| | | | | 323/266 |
| 2015/0103456 | A1 | 4/2015 | Ghisla et al. | |
| 2016/0036215 | A1 | 2/2016 | Mannuccini et al. | |

FOREIGN PATENT DOCUMENTS

| | | |
|---|---|---|
| CN | 107749618 A | 3/2018 |
| CN | 107863749 A | 3/2018 |
| CN | 108469570 A | 8/2018 |
| CN | 108512416 A | 9/2018 |
| CN | 109119981 A | 1/2019 |
| CN | 109473990 A | 3/2019 |
| CN | 109347077 B | 5/2020 |
| CN | 109119981 B | 10/2020 |
| KR | 101104126 B1 | 1/2012 |

\* cited by examiner

CONTROL METHOD FOR CURRENT-LIMITING CONTROL CIRCUIT AND ELECTRICAL SYSTEM

CROSS REFERENCE TO RELATED APPLICATIONS

The present disclosure is a United States National Stage of International Application No. PCT/CN2021/105781 filed Jul. 12, 2021, and claims priority of Chinese Patent Application No. 202011241184.2 filed Nov. 9, 2020, the disclosures of which are hereby incorporated by reference in their entireties.

BACKGROUND OF THE INVENTION

Field of the Invention

The disclosure relates to the field of electrical systems, in particular to a control method for a current-limiting control circuit and an electrical system.

Description of Related Art

When there is a short circuit, a very large current will be generated in the circuit, which may burn out an equipment and lines, or even cause a fire, leading to large losses. In addition, the entire circuit needs to be powered off for maintenance and cannot be used normally. In relevant technologies, a common scheme is to add an over-current circuit breaker or fuse (protective tube) in the circuit. When the current value exceeds a threshold, the over-current circuit breaker will trip or the fuse (protective tube) will be blown.

SUMMARY OF THE INVENTION

The present disclosure provides a control method for a current-limiting control circuit and an electrical system.

According to the first aspect of the present disclosure, a control method for a current-limiting control circuit is provided. The current-limiting control circuit comprises a high voltage side connected with a direct-current (DC) bus, a low voltage side connected with a load, and a regulating unit connected with the high voltage side and the low voltage side, the regulating unit comprising at least one MOS transistor, wherein the control method comprises: detecting current $I_0$ of the current-limiting control circuit; determining whether the current $I_0$ is greater than a preset current I; and determining that the current-limiting control circuit has a short circuit fault, and entering a current limiting control mode to limit a persistent growth of the current, in a case where the current $I_0$ is greater than the preset current I.

According to the second aspect of the present disclosure, an electrical system is provided, in which the control method of the current-limiting control circuit described above is adopted.

According to a third aspect of the present disclosure, an electrical system is provided, comprising a memory and a processor, wherein the memory stores computer programs, which when executed by the processor, cause the processor to implement the steps of the control method of the current-limiting control circuit according to any embodiment above.

According to a further aspect of the present invention, there is also provided a computer-readable storage medium on which computer program instructions are stored, which when executed by a processor, cause the processor to implement the steps of the control method of the current-limiting control circuit according to any embodiment above.

BRIEF DESCRIPTION OF THE DRAWINGS

In order to more clearly explain the embodiments of the present disclosure or the technical solutions in the prior art, a brief introduction will be given below for the drawings required to be used in the description of the embodiments or the prior art. It is obvious that, the drawings illustrated as follows are merely some of the embodiments of the present disclosure. For a person skilled in the art, he or she may also acquire other drawings according to such drawings on the premise that no inventive effort is involved.

DESCRIPTION OF THE INVENTION

In order to make the technical problem, technical solution and beneficial effects of the present disclosure more clear and explicit, the present disclosure will be further described in detail in combination with the drawings and the embodiments. It should be understood that the detailed embodiments that will be described herein are only used for explaining the present disclosure, but not used for limiting the present disclosure.

Therefore, a feature indicated in this description will be used to describe one of the features of an embodiment of this disclosure, rather than imply that each embodiment of this disclosure must have the described feature. In addition, it should be noted that many features are described this description. Although some features can be combined to show a possible system design, these features can also be used for other unspecified combinations. Thus, unless otherwise stated, the stated combinations are not intended to be restrictive.

The principle and structure of the present disclosure will be described in detail below in conjunction with specific embodiments.

The inventors of the present disclosure have found the following problems existed in the above-mentioned related art. In a case of a circuit fault, it is not possible to achieve a non-staged protection and to control the current within a certain range.

In view of this, instead of the above related technologies in which a fuse is blown, the present disclosure proposes a control method for a current-limiting control circuit and an electrical system, which can limit a continuous increase in current when the circuit fault occurs. Therefore, the circuit can operate without a break when a fault occurs, rather than being unable to operation after protection. Furthermore, it can take action in time when an equipment fault occurs, thereby ensuring a timely protection and avoiding problems such as disaster expansion, burnout devices, etc.

Figure 2:
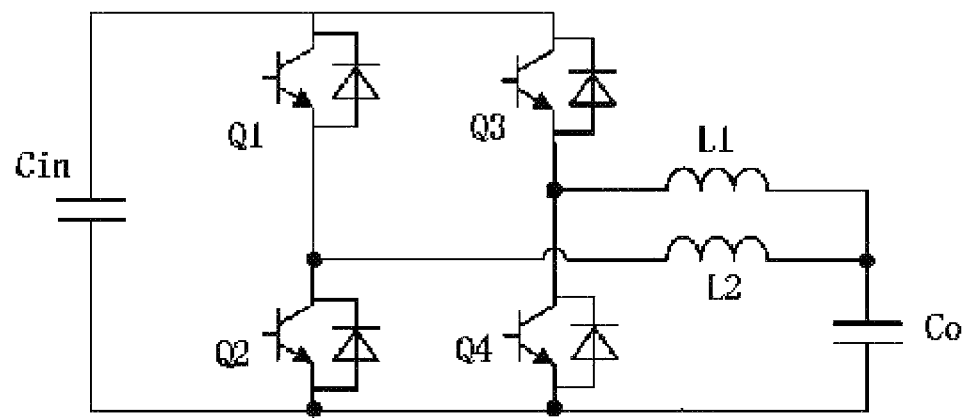
FIG. 2 is a structural diagram of a current-limiting control circuit according to some embodiments of the present disclosure.

In some embodiments, as shown in FIG. 2, the current-limiting control circuit of the present disclosure comprises a high voltage side Cin connected to a DC bus, a low voltage side Co connected with a load, and a regulating unit connected with the high voltage side and the low voltage side. The regulating unit comprises at least one MOS transistor, and the current of the circuit can be adjusted by adjusting the MOS transistor.

As shown in FIG. 2, the regulating unit is composed of four MOS transistors, namely MOS transistor Q1, MOS transistor Q2, MOS transistor Q3, and MOS transistor Q4. Drain electrodes of MOS transistor Q1 and MOS transistor Q3 are connected together, and connected to an output terminal of the high voltage side Cin. A source electrode of MOS transistor Q1 is connected to a drain electrode of MOS transistor Q2 and an input terminal of the low voltage side Co. A source electrode of MOS transistor Q3 is connected to a drain electrode of MOS transistor Q4 and the input terminal of the low voltage side Co. Source electrodes of MOS transistor Q2 and MOS transistor Q4 are connected together, and connected to an input terminal of the high voltage side Cin and an output terminal of the low voltage side Co.

The high voltage side Cin is connected to the low voltage side Co through the regulating unit. Current out of the high voltage side Cin and current out of the low voltage side Co must pass through the regulating unit to reach the other side. By adjusting the MOS transistors, it is possible to control an amount of current flowing out and into the MOS transistors, and thereby regulating the current.

In some embodiments, the control method of the current-limiting control circuit comprises: detecting current $I_0$ of the current-limiting control circuit; determining whether the current $I_0$ is greater than a preset current I; and if so, determining that the current-limiting control circuit has a short circuit fault, and entering a current limiting control mode to limit a persistent growth of the current.

If the current $I_0$ is less than the preset current I, the current-limiting control circuit works normally is determined and a bidirectional conduction mode is entered to achieve a bidirectional conduction between the low voltage side and the high voltage side through the MOS transistor and a parasitic diode on the MOS transistor.

In some embodiments, the current limiting control mode comprises: a primary side voltage droop control mode. In a case where it is determined that the current-limiting control circuit has the short circuit fault, whether there is a voltage across the load is detected before entering the current limiting control mode. If so, the DC bus has a short circuit fault is determined, and the primary side voltage droop control mode is entered, which is used to adjust current of the high voltage side.

In some embodiments, the current limiting control mode further comprises a secondary side voltage droop control mode. In a case where it is determined that the current-limiting control circuit has the short circuit fault, whether there is a voltage across the load is detected before entering the current limiting control mode; and the load has a short circuit fault is determined, and the secondary side voltage droop control mode is entered, which is used to adjust current of the low voltage side, in a case where there is no voltage across the load.

In some embodiments, the primary side voltage droop control mode comprises: entering a first droop control stage, and adjusting an input current of the MOS transistor by adjusting a duty cycle of the MOS transistor to reduce a voltage of the high voltage side and keep an output power of the high voltage side unchanged.

In this control stage, the current in the current-limiting control circuit increases persistently, and the output voltage of the high voltage side Cin gradually decreases, remaining the output power of the current-limiting control circuit unchanged. The reason why the current in the current-limiting control circuit increases for a period of time when a fault occurs on the high voltage side is that, when the current-limiting control circuit fails, the current in the current-limiting control circuit has not reached a maximum operating current that the circuit can withstand, and the current can still increase to a certain extent.

When the current has increased to a certain value, the circuit may be damaged if the current further increases. In this case, it is determined whether the current $I_0$ has reached a threshold current $I_1$, which is the maximum working current that the current-limiting control circuit can withstand; if so, a first constant current control stage is entered, a PI adjustment is performed by adjusting the duty cycle of the MOS transistor, to keep current of the high voltage side unchanged.

Figure 3:
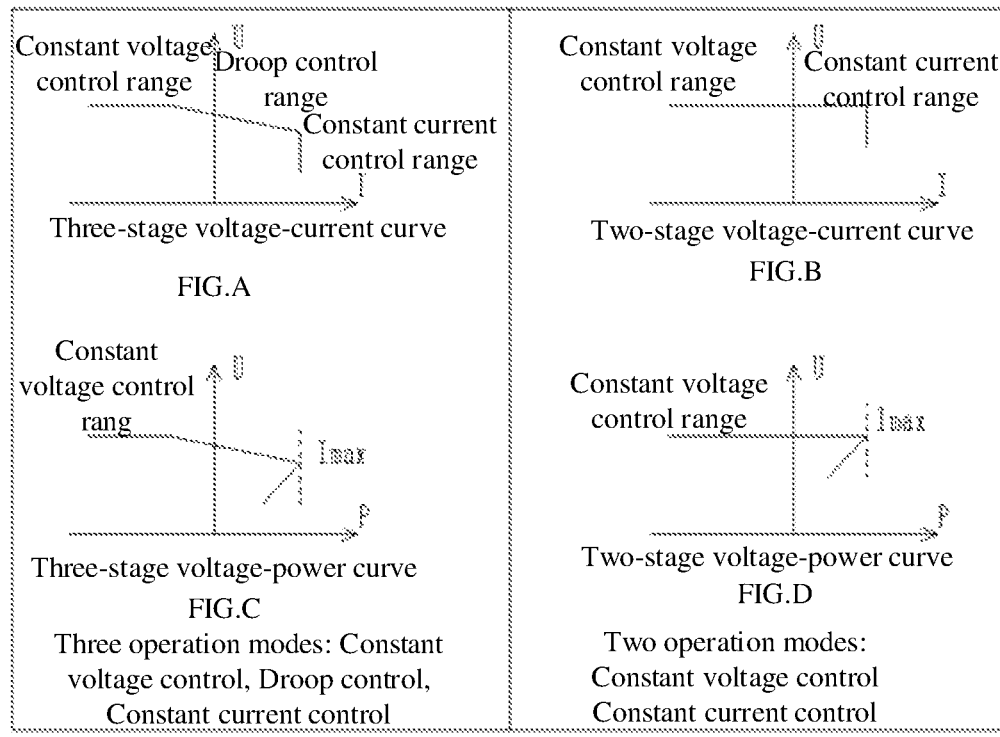
FIG. 3 is a schematic diagram of control curves in various control modes provided by the disclosure.

In some embodiments, FIGS. 3A and 3C show curves of the primary side voltage droop control mode. A constant voltage control stage is a normal working stage of the circuit, in which a goal is to ensure that an output voltage is constant. When a fault occurs, a droop control stage is entered, in which the current increases persistently, the voltage decreases, and the power increases. The current no longer increases when it reaches the threshold current $I_1$, and a control is switched to constant current control. In this case, the actual voltage can be adjusted by adjusting the MOS transistor. At that point, the current is unchanged, and the power changes with the voltage.

As shown in FIGS. 3B and 3D, when a circuit fault occurs, if the current in the circuit has reached the threshold current the droop control stage is not required, and the control will be directly transferred to the constant current control stage, causing two-segment curves accordingly.

In some embodiments, the secondary side voltage droop control mode comprises: entering a second droop control stage, and adjusting an input current of the MOS transistor by adjusting a duty cycle of the MOS transistor to reduce a voltage of the low voltage side and keep an output power of the low voltage side unchanged.

In this control stage, the current in the current-limiting control circuit increases persistently, and the output voltage of the low voltage side Co gradually decreases, remaining the output power of the circuit unchanged. The reason why the current in the current-limiting control circuit increases for a period of time when a fault occurs on the low voltage side is that, when the current-limiting control circuit fails, the current in the circuit has not reached the maximum operating current that the circuit can withstand, and the current can still increase to a certain extent.

When the current has increased to a certain value, the circuit may be damaged if the current further increases. In this case, it is determined whether the current $I_0$ has reached a threshold current $I_1$, which is the maximum working current that the current-limiting control circuit can withstand; if so, a second constant current control stage is entered, a PI adjustment is performed by adjusting the duty cycle of the MOS transistor, to keep current of the low voltage side unchanged.

Curves of the secondary side voltage droop control mode are identical to that of the primary side voltage droop control mode, and reference can be made to the curves for the primary side voltage droop control, which will not be repeated here.

It should be noted here that if the high voltage side or the DC bus fails, the primary side voltage droop control mode is adopted, and if the low voltage side or load fails, the secondary side voltage droop control mode is adopted, because the primary side voltage droop control mode is used for current regulation on the high voltage side, while the secondary side voltage droop control mode is used to control the low voltage side. When the high voltage side or the DC bus fails, if the secondary side voltage droop control mode is adopted, a regulation is required to be further transferred to the high voltage side. Therefore, if the high voltage side or the DC bus fails, the primary side voltage droop control mode is adopted. Similarly, if the low voltage side or the load fails, the secondary side voltage droop control mode is adopted.

In some embodiments, the current limiting control method further comprises: a constant power control mode. When the current-limiting control circuit needs to ensure that a power of the low voltage side Co of the circuit, that is, a power of the load, remains unchanged, the MOS transistor is adjusted to change current flowing through the load and a voltage across the load, to maintain the power of the load unchanged. Since a relation between power, voltage and current can be represented by P=IU, the current of the load is inversely proportional to the voltage of the load when the load power is guaranteed to be constant. When the current flowing through the load increases, the voltage across the load will decrease, and when the current flowing through the load decreases, the voltage across the load will increase.

In some embodiments, the current limiting control method further comprises a maximum power tracking control mode. It is determined whether operating parameters of the current-limiting control circuit meet a maximum power control condition before entering the current limiting control mode; if so, the maximum power tracking control mode is entered; and if not, the current limiting control mode is entered.

In some embodiments, the maximum power tracking control mode comprises: detecting an output power of the low voltage side to obtain a first detection power $P_0$, adjusting a duty cycle of the MOS transistor to change the output power of the low voltage side, and detecting the output power the low voltage side again to obtain a second detection power $P_1$, in a case where the current I0 reaches the threshold current $I_1$; determining whether the first detection power $P_0$ is greater than the second detection power $P_1$; if so, adjusting the duty cycle of the MOS transistor to maintain the output power of the low voltage side to the first detection power $P_0$; and if not, adjusting the duty cycle of the MOS transistor to maintain the output power of the low voltage side to the second detection power $P_1$.

Furthermore, the constant power control mode is required before the maximum power tracking control mode. When the current-limiting control circuit fails, the current in the circuit has not reached the maximum value. In the constant power control mode, the power remains unchanged while the current increases persistently. Therefore, it is necessary to execute the constant power control mode for a period of time to make the current reach the threshold current, so as to obtain the maximum power.

The present disclosure further provides an electrical system, in which the control method of a current-limiting control circuit described above is adopted.

Figure 1:
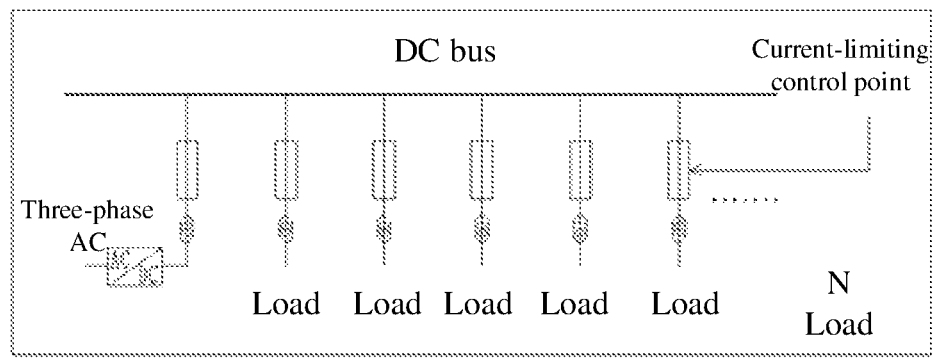
FIG. 1 is a structural diagram of an electrical system according to some embodiments of the present disclosure.

In some embodiments, as shown in FIG. 1, the electrical system comprises a DC bus and at least one load connected to the DC bus, a high voltage side of the current-limiting control circuit being connected to the DC bus, and a low voltage side of the current-limiting control circuit being connected to the load.

Figure 4:
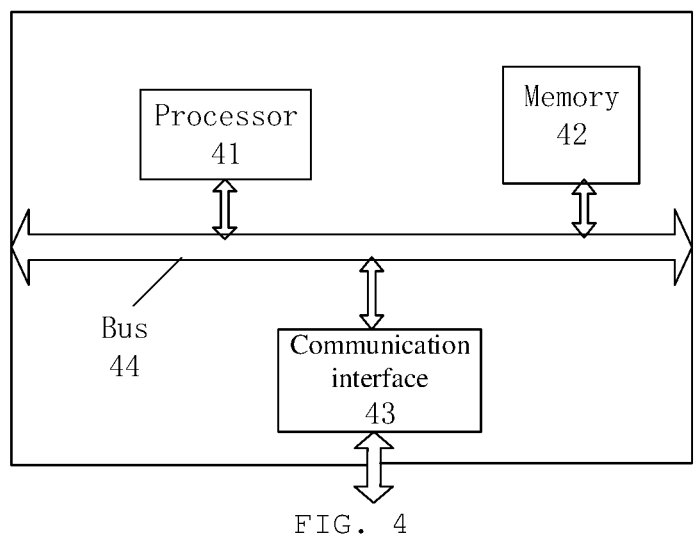
FIG. 4 is a schematic block diagram of an electrical system according to some embodiments of the present disclosure.

In some embodiments, as shown in FIG. 4, the electrical system comprises a memory 41, a processor 42, a communication interface 43, and a bus 44. The memory 41 is used to store instructions. The processor 42 is coupled to the memory 41, and is configured to, based on instructions stored in the memory 41, execute the control method of a current-limiting control circuit provided in any embodiment described above.

In some embodiments, the memory 41 comprises a high speed RAM memory, a non-volatile memory and the like. In some embodiments, the memory 41 is also a memory array. In some embodiments, the memory 41 is also partitioned into blocks, which is combined into virtual volumes according to a certain rule. In some embodiments, the processor 42 is a central processing unit (CPU), or is an Application Specific Integrated Circuit (ASIC) or one or more integrated circuits configured to implement the control method of a current-limiting control circuit provided in the present disclosure.

In some embodiments, the present disclosure further provides a computer-readable storage medium on which computer program instructions are stored, which when executed by a processor, cause the processor to implement the steps of the control method of the current-limiting control circuit according to any embodiment described above.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical storage device, etc.) having computer-usable program code embodied therein.

Compared with related technologies, the present disclosure provides a control method for a current-limiting control circuit and an electrical system. When the circuit current increases due to a circuit exception or short circuit fault, the current can be limited within a certain range without being infinitely increased, and normal operation of the system can be maintained; when an equipment exception or short circuit occurs, a protection action can be taken in time to prevent problems such as disaster expansion, burnout devices, etc. caused by a too large current in the case of untimely protection; As a replacement of fusing protection in the relevant technologies, after protection according to the present application, the circuit can continue to operate normally, thereby the technical problem in the relevant technologies that the entire circuit cannot work uninterruptedly after the fuse is blown can be solved.

The method and system of the present disclosure may be implemented in many ways. For example, the method and system of the present disclosure may be implemented by software, hardware, firmware, or any combination of software, hardware, and firmware. The above sequence of steps of the method is merely for the purpose of illustration, and the steps of the method of the present disclosure are not limited to the above-described specific order unless otherwise specified. In addition, in some embodiments, the present disclosure may also be implemented as programs recorded in a recording medium, which comprise machine-readable instructions for implementing the method according to the present disclosure. Thus, the present disclosure also covers a recording medium storing programs for executing the method according to the present disclosure.

The above is merely preferred embodiments of this disclosure, and is not limitation to this disclosure. Within spirit and principles of this disclosure, any modification, replacement, improvement and etc. shall be contained in the protection scope of this disclosure.

What is claimed is:

1. A control method for a current-limiting control circuit, the current-limiting control circuit comprising a high voltage side connected with a direct-current (DC) bus, a low voltage side connected with a load, and a regulating unit connected with the high voltage side and the low voltage side, the regulating unit comprising at least one MOS transistor, wherein the control method comprises:

detecting current $I_0$ of the current-limiting control circuit;

determining whether the current $I_0$ is greater than a preset current I; and determining that the current-limiting control circuit has a short circuit fault, and entering a current limiting control mode to limit a persistent growth of the current $I_0$, in a case where the current $I_0$ is greater than the preset current I, wherein the current limiting control mode comprises a primary side voltage droop control mode used to adjust current of the high voltage side, and the control method comprises:

detecting whether there is a voltage across the load before entering the current limiting control mode; and determining that the DC bus has a short circuit fault, and entering the primary side voltage droop control mode, in a case where there is a voltage across the load.

2. The control method according to claim 1, further comprising:

determining that the current-limiting control circuit works normally and entering a bidirectional conduction mode to achieve a bidirectional conduction between the low voltage side and the high voltage side through the MOS transistor and a parasitic diode on the MOS transistor, in a case where the current I0 is less than the preset current I.

3. The control method according to claim 1, wherein the current limiting control mode comprises: a secondary side voltage droop control mode and the control method comprises:

detecting whether there is a voltage across the load before entering the current limiting control mode; and determining that the load has a short circuit fault, and entering the secondary side voltage droop control mode, which is used to adjust current of the low voltage side, in a case where there is no voltage across the load.

4. The control method according to claim 3, wherein the secondary side voltage droop control mode comprises:

entering a second droop control stage, and adjusting an input current of the MOS transistor by adjusting a duty cycle of the MOS transistor to reduce a voltage of the low voltage side and keep an output power of the low voltage side unchanged;

determining whether the current $I_0$ has reached a threshold current $I_1$, wherein the threshold current $I_1$ is a maximum working current that the current-limiting control circuit can withstand; and entering a second constant current control stage, and performing a PI adjustment by adjusting the duty cycle of the MOS transistor, to keep current of the low voltage side unchanged, in a case where the current $I_0$ has reached a threshold current $I_1$.

5. The control method according to claim 1, wherein the primary side voltage droop control mode comprises:

entering a first droop control stage, and adjusting an input current of the MOS transistor by adjusting a duty cycle of the MOS transistor to reduce a voltage of the high voltage side and keep an output power of the high voltage side unchanged;

determining whether the current $I_0$ has reached a threshold current $I_1$, wherein the threshold current $I_1$ is a maximum working current that the current-limiting control circuit can withstand; and entering a first constant current control stage, and performing a PI adjustment by adjusting the duty cycle of the MOS transistor, to keep current of the high voltage side unchanged, in a case where the current $I_0$ has reached a threshold current $I_1$.

6. The control method according to claim 1, further comprising:

determining whether operating parameters of the current-limiting control circuit meet a maximum power control condition before entering the current limiting control mode; and entering a maximum power tracking control mode in a case where the operating parameters of the current-limiting control circuit meet the maximum power control condition, and entering the current limiting control mode in a case where the operating parameters of the current-limiting control circuit do not meet the maximum power control condition.

7. The control method according to claim 6, wherein the maximum power tracking control mode comprises:

detecting an output power of the low voltage side to obtain a first detection power $P_0$, adjusting a duty cycle of the MOS transistor to change the output power of the low voltage side, and detecting the output power the low voltage side again to obtain a second detection power $P_1$, in a case where the current $I_0$ reaches the threshold current $I_1$;

determining whether the first detection power $P_0$ is greater than the second detection power $P_1$;

adjusting the duty cycle of the MOS transistor to maintain the output power of the low voltage side to the first detection power $P_0$, in a case where the first detection power $P_0$ is greater than the second detection power $P_1$, and adjusting the duty cycle of the MOS transistor to maintain the output power of the low voltage side to the second detection power $P_1$, in a case where the first detection power $P_0$ is lower than the second detection power $P_1$.

8. An electrical system, in which the control method of a current-limiting control circuit according to claim 1 is adopted.

9. The electrical system according to claim 8, comprising the DC bus and at least one load connected to the DC bus, wherein the high voltage side of the current-limiting control circuit is connected to the DC bus, and the low voltage side of the current-limiting control circuit is connected to the at least one load.

10. An electrical system, comprising a memory and a processor, wherein the memory stores computer programs, which when executed by the processor, cause the processor to perform the control method of a current-limiting control circuit according to claim 1.

11. The electrical system according to claim 10, wherein the memory further stores computer programs, which when executed by the processor, cause the processor to:

determine that the current-limiting control circuit works normally and entering a bidirectional conduction mode to achieve a bidirectional conduction between the low voltage side and the high voltage side through the MOS transistor and a parasitic diode on the MOS transistor, in a case where the current $I_0$ is less than the preset current I.

12. The electrical system according to claim 10, wherein the current limiting control mode comprises: a secondary side voltage droop control mode and the computer programs when executed by the processor, cause the processor to:
detect whether there is a voltage across the load before entering the current limiting control mode; and
determine that the load has a short circuit fault, and enter the secondary side voltage droop control mode, which is used to adjust current of the low voltage side, in a case where there is no voltage across the load.

13. The electrical system according to claim 12, wherein the secondary side voltage droop control mode comprises:
entering a second droop control stage, and adjusting an input current of the MOS transistor by adjusting a duty cycle of the MOS transistor to reduce a voltage of the low voltage side and keep an output power of the low voltage side unchanged;
determining whether the current $I_0$ has reached a threshold current $I_1$, wherein the threshold current $I_1$ is a maximum working current that the current-limiting control circuit can withstand; and
entering a second constant current control stage, and performing a PI adjustment by adjusting the duty cycle of the MOS transistor, to keep current of the low voltage side unchanged, in a case where the current $I_0$ has reached a threshold current $I_1$.

14. The electrical system according to claim 13, wherein the maximum power tracking control mode comprises:
detecting an output power of the low voltage side to obtain a first detection power $P_0$, adjusting a duty cycle of the MOS transistor to change the output power of the low voltage side, and detecting the output power the low voltage side again to obtain a second detection power $P_1$, in a case where the current $I_0$ reaches the threshold current $I_1$;
determining whether the first detection power $P_0$ is greater than the second detection power $P_1$;
adjusting the duty cycle of the MOS transistor to maintain the output power of the low voltage side to the first detection power $P_0$, in a case where the first detection power $P_0$ is greater than the second detection power $P_1$, and adjusting the duty cycle of the MOS transistor to maintain the output power of the low voltage side to the second detection power $P_1$, in a case where the first detection power $P_0$ is lower than the second detection power $P_1$.

15. The electrical system according to claim 10, wherein the primary side voltage droop control mode comprises:
entering a first droop control stage, and adjusting an input current of the MOS transistor by adjusting a duty cycle of the MOS transistor to reduce a voltage of the high voltage side and keep an output power of the high voltage side unchanged;
determining whether the current $I_0$ has reached a threshold current $I_1$, wherein the threshold current $I_1$ is a maximum working current that the current-limiting control circuit can withstand; and
entering a first constant current control stage, and performing a PI adjustment by adjusting the duty cycle of the MOS transistor, to keep current of the high voltage side unchanged, in a case where the current $I_0$ has reached a threshold current $I_1$.

16. The electrical system according to claim 10, wherein the memory further stores computer programs, which when executed by the processor, cause the processor to:
determine whether operating parameters of the current-limiting control circuit meet a maximum power control condition before entering the current limiting control mode; and
enter a maximum power tracking control mode in a case where the operating parameters of the current-limiting control circuit meet the maximum power control condition, and enter the current limiting control mode in a case where the operating parameters of the current-limiting control circuit do not meet the maximum power control condition.

17. A computer-readable storage medium on which computer program instructions are stored, which when executed by a processor, cause the processor to perform the control method of a current-limiting control circuit according to claim 1.

18. The computer-readable storage medium according to claim 17, on which computer program instructions are further stored, which when executed by the processor, cause the processor to:
determine that the current-limiting control circuit works normally and entering a bidirectional conduction mode to achieve a bidirectional conduction between the low voltage side and the high voltage side through the MOS transistor and a parasitic diode on the MOS transistor, in a case where the current $I_0$ is less than the preset current I.

19. A control method for a current-limiting control circuit, the current-limiting control circuit comprising a high voltage side connected with a direct-current (DC) bus, a low voltage side connected with a load, and a regulating unit connected with the high voltage side and the low voltage side, the regulating unit comprising at least one MOS transistor, wherein the control method comprises:
detecting current $I_0$ of the current-limiting control circuit;
determining whether the current $I_0$ is greater than a preset current I; and
determining that the current-limiting control circuit has a short circuit fault, and entering a current limiting control mode to limit a persistent growth of the current $I_0$, in a case where the current $I_0$ is greater than the preset current I,
wherein the current limiting control mode comprises: a secondary side voltage droop control mode and the control method comprises:
detecting whether there is a voltage across the load before entering the current limiting control mode; and
determining that the load has a short circuit fault, and entering the secondary side voltage droop control mode, which is used to adjust current of the low voltage side, in a case where there is no voltage across the load.

20. A control method for a current-limiting control circuit, the current-limiting control circuit comprising a high voltage side connected with a direct-current (DC) bus, a low voltage side connected with a load, and a regulating unit connected with the high voltage side and the low voltage side, the regulating unit comprising at least one MOS transistor, wherein the control method comprises:
detecting current $I_0$ of the current-limiting control circuit;
determining whether the current $I_0$ is greater than a preset current I;

determining whether operating parameters of the current-limiting control circuit meet a maximum power control condition before entering the current limiting control mode;
determining that the current-limiting control circuit has a short circuit fault, in a case where the current $I_0$ is greater than the preset current I; and
entering a maximum power tracking control mode in a case where the operating parameters of the current-limiting control circuit meet a maximum power control condition, and entering a current limiting control mode to limit a persistent growth of the current $I_0$, in a case where the operating parameters of the current-limiting control circuit do not meet the maximum power control condition.

* * * * *